May 5, 1942.                J. CORBY, JR                    2,281,871
                        THRUST MEASURING DEVICE
                        Filed Sept. 15, 1939              5 Sheets-Sheet 1

Inventor

Joseph Corby Jr.

By Cameron, Kerkam & Sutton
                        Attorneys

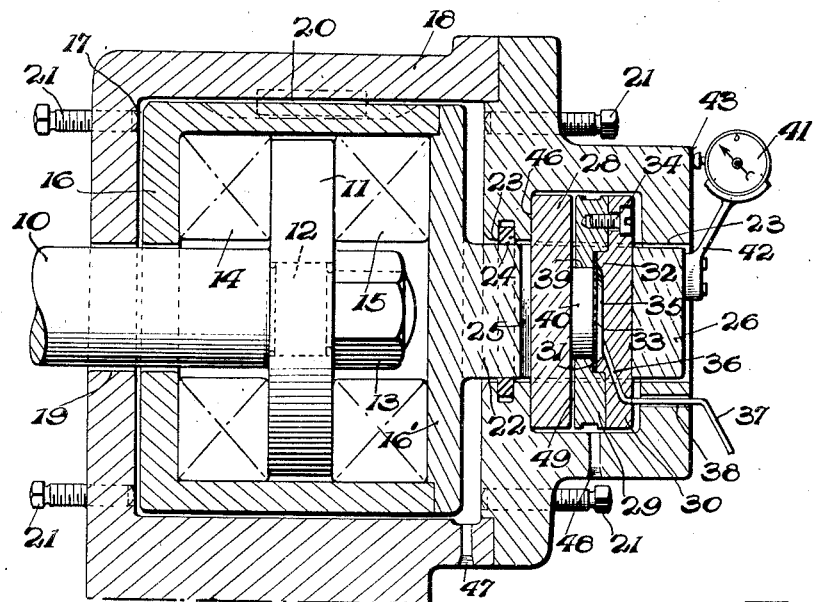

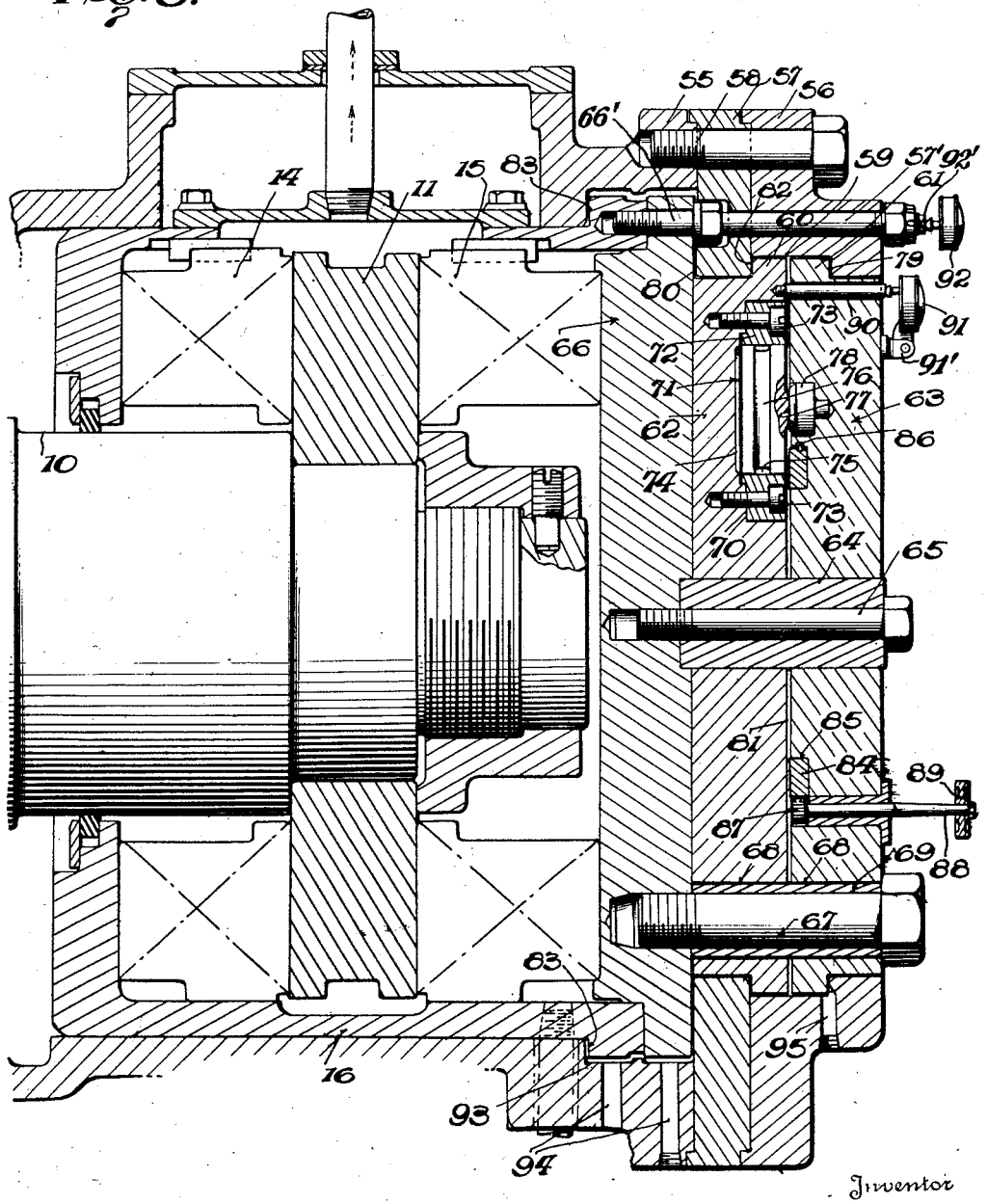

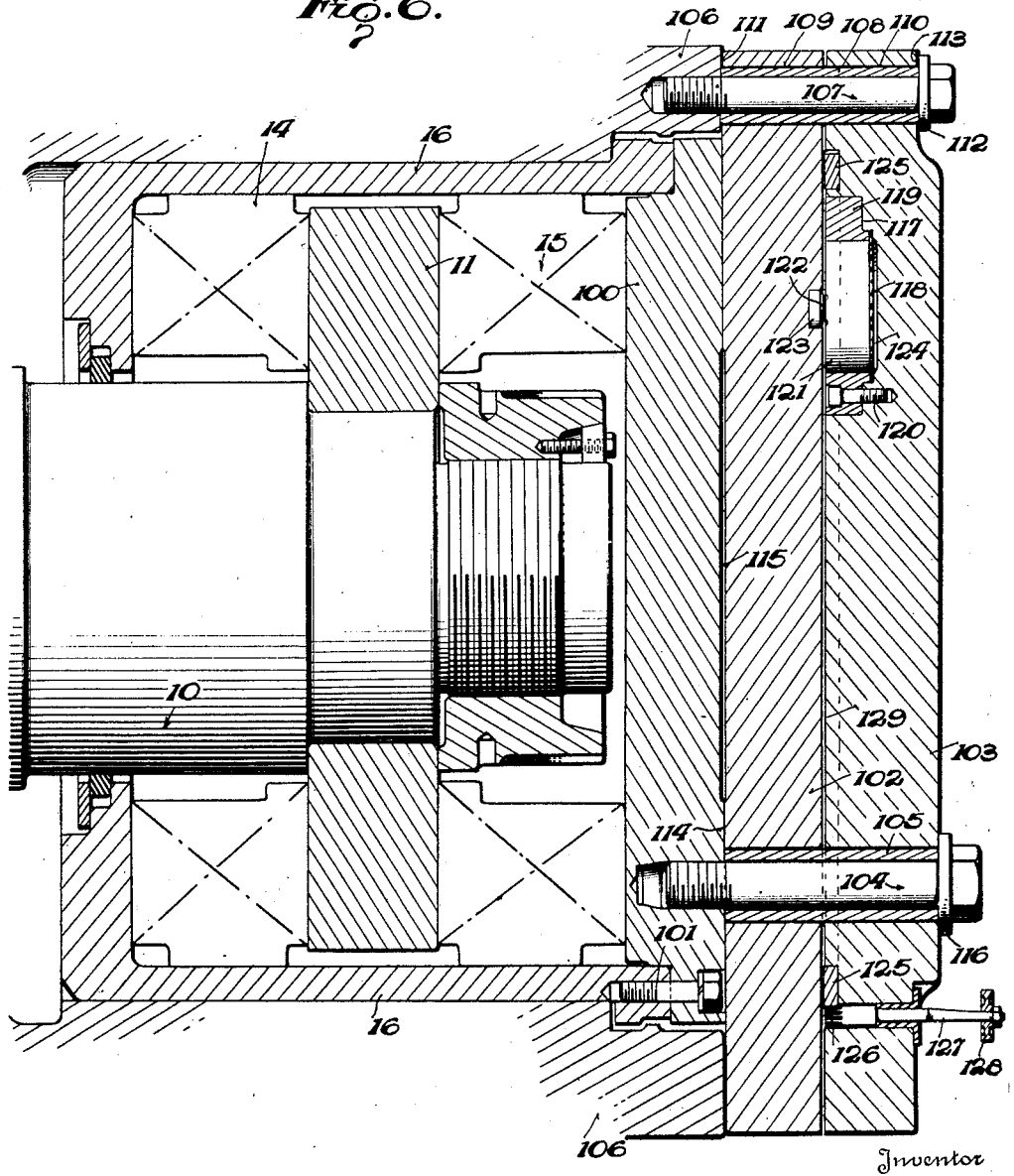

May 5, 1942. J. CORBY, JR 2,281,871
THRUST MEASURING DEVICE
Filed Sept. 15, 1939 5 Sheets-Sheet 5

Inventor
Joseph Corby Jr.
By
Cameron, Kerkam + Sutton Attorneys

Patented May 5, 1942

2,281,871

UNITED STATES PATENT OFFICE 2,281,871

THRUST MEASURING DEVICE

Joseph Corby, Jr., Philadelphia, Pa., assignor to Kingsbury Machine Works, Inc., Philadelphia, Pa., a corporation of Delaware Application September 15, 1939, Serial No. 295,131

20 Claims. (Cl. 265—1)

This invention relates to thrust measuring devices, and more particularly to devices for measuring the thrust of double acting thrust bearings designed to sustain relatively heavy loads.

In the patent of Albert Kingsbury No. 2,091,207 granted August 24, 1937, for Thrust measuring device, there is disclosed and generically claimed a thrust measuring device for measuring relatively heavy thrusts and which employs a cage for transmitting the thrust in either direction on a double-acting thrust bearing to one or the other of two sets of one or more cells for hydrostatically measuring the thrust by means of the pressure developed in said cells, thus using a separate set of thrust measuring cells to measure the thrust in each direction.

It is an object of this invention to provide a thrust measuring device of the type characterized which measures the thrust in both directions by means of a single cell or single set of cells.

Another object of this invention is to provide a thrust measuring device employing one or a plurality of cells in which the thrust is measured hydrostatically and which utilizes the same cell or cells for measuring the thrust in both directions.

Another object of this invention is to provide a thrust measuring device of simplified and improved construction which can be rendered operative or inoperative at will, and which in either event does not interfere with the normal and proper operation of the thrust bearing with which it is associated.

Another object of this invention is to provide an improved thrust measuring device which is simple, compact and rugged in construction, and which is easy to install and operate. Other objects will appear as the description of the invention proceeds.

The invention is capable of receiving a variety of mechanical expressions, three of which are illustrated on the accompanying drawings, but it is to be expressly understood that the drawings are for purposes of illustration only, and are not to be construed as a definition of the limits of the invention, reference being had to the appended claims for that purpose. Referring in detail to the accompanying drawings wherein the same reference characters are employed in different views to represent corresponding parts:

Figs. 2 and 3 are corresponding views of the embodiment of Fig. 1 illustrating the same embodiment when measuring the thrust in "ahead" and "astern" directions respectively;

Fig. 4 is a corresponding view of the embodiment of Fig. 1, illustrating means for locking the thrust meter out of operation;

Fig. 5 is a somewhat schematic axial section of an embodiment of the present invention employing a set of a plurality of cells for measuring the thrust in both directions;

Fig. 6 is a similar section of that embodiment of the present invention which at present is preferred because of its simplification.

Figure 1:
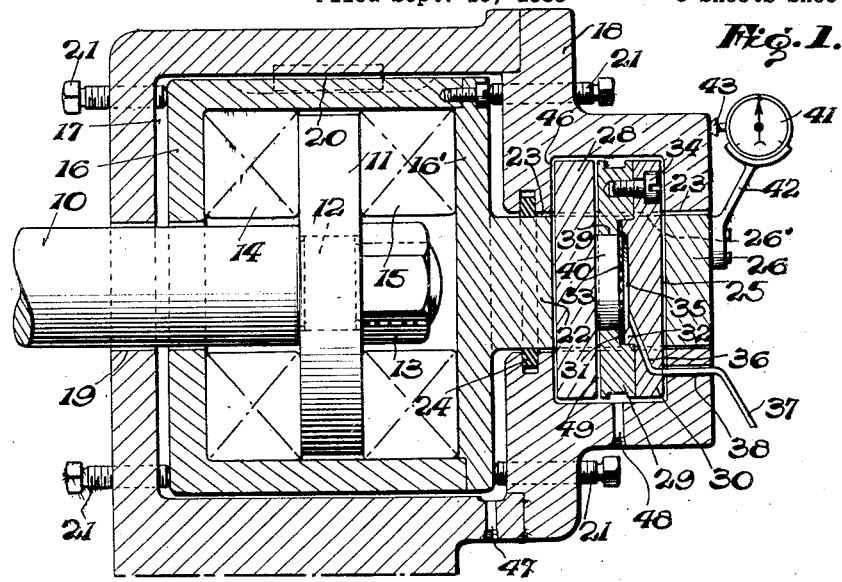
Fig. 1 is a somewhat schematic axial section illustrating an embodiment of the present invention which employs a single cell, with the parts in neutral or central position.

In the form shown in Figs. 1 to 4, the shaft 10 is provided in any suitable way with a thrust collar 11, here shown as retained on a reduced extension 12 of the shaft by a nut 13 and suitably locked to the shaft so as to prevent relative rotation therebetween. Cooperating with the opposed faces of said thrust collar 11 are thrust bearings 14 and 15 diagrammatically indicated, said bearings being of any suitable construction but preferably employing a plurality of tiltably mounted bearing shoes as is usual in Kingsbury bearings.

Figure 2:
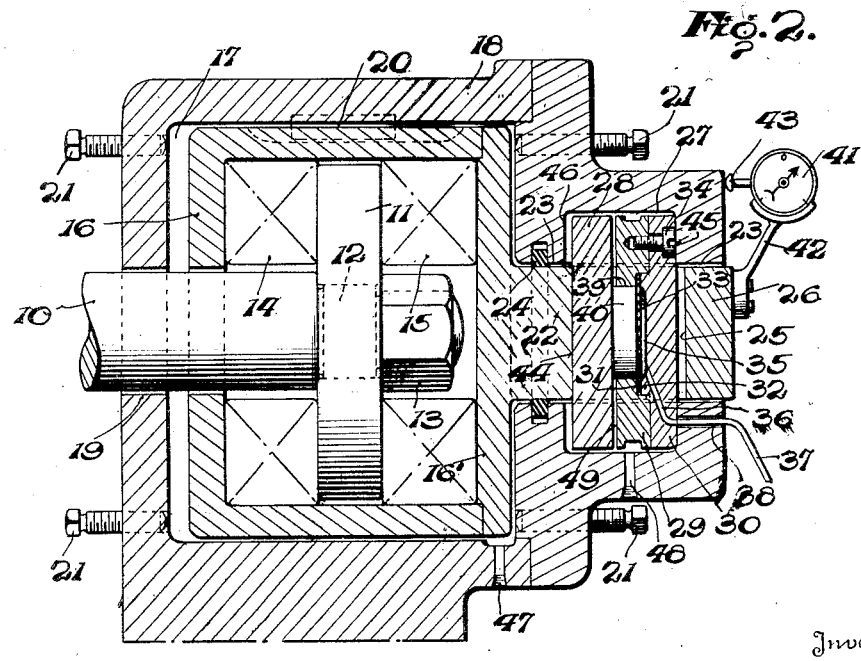

Surrounding the thrust collar and its thrust bearing elements is a cylindrical cage 16 which may be of any suitable construction but which embraces the thrust bearings 14 and 15 in an axial direction so as to provide abutments for the thrust receiving elements of both bearings 14 and 15. The cage 16 is mounted for axial movement within the chamber 17 of a housing 18 of any suitable form and construction, said housing being shown as provided with an aperture at 19 through which the shaft 10 extends. To prevent rotation of the cage 16 within said housing 18, said cage is keyed to the housing as shown at 20, or dowels could be used if preferred. Extending through the wall of the housing 18 at both axial extremities of the chamber 17 are a plurality of screws 21 which, as shown in Fig. 1, may be tightened up to engage the cage 16 and lock the same in a central or neutral position against axial movement, or said screws may be backed off as shown in Figs. 2 and 3, leaving the cage free to move axially within the chamber 17, in one direction or the other depending upon the direction of the thrust.

Cage 16 has attached to the end plate 16' thereof or formed integrally therewith an axial extension 22 which may be round or rectangular in cross section and which extends through a correspondingly shaped aperture 23 in the housing 18, a fluid-tight joint being preferably provided in any suitable way where said extension passes through said aperture, as by the ring 24. Extension 22 is in the form of a yoke, having an aperture extending transversely therethrough so as to provide a chamber 25 intermediate its length, the end portion 26 of the extension 22 being connected by lateral walls 23' at either side of said chamber 25 to the inner portion of said extension.

The aperture 23 through the housing 18 is enlarged opposite the chamber 25 to provide a chamber 27 which may correspond in shape to the cross section of the extension 22. Disposed within said chambers 25 and 27 is a thrust measuring unit which includes an abutment plate 28, and a pair of plates 29 and 30, which together constitute a composite cell plate, said plates preferably conforming in shape to the shape of the chamber 27. As shown plate 29 is recessed at 31 and plate 30 is provided with an annular projection 32 extending into said recess 31 and clamping against the bottom face of said recess a diaphragm 33 of any suitable size, construction and material. Screws 34 secure the plates 29 and 30 fixedly together so as to form a liquid-tight joint at the periphery of said diaphragm 33. Plate 30 is recessed opposite said diaphragm as shown at 35 to provide a chamber closed by said diaphragm and which chamber is adapted to be filled with any suitable thrust measuring liquid, as castor oil. Chamber 35 is in communication with a passage 36 extending through the plate 30 and said passage in turn is in communication with a pipe 37 extending through an aperture 38 in the end wall of the housing 18. Plate 29 has a centrally arranged aperture 39 of approximately the same size and shape as the chamber 35, and disposed in said aperture 39 is a block 40 adapted to slide in said aperture and to make a flat faced contact with said diaphragm 33. Block 40 is seated on the abutment plate 28, and while it may have flat faced engagement therewith as here indicated, it preferably has a spherically faced contact therewith as illustrated in Fig. 5 so that said block may be free to tilt with respect to its abutment plate to maintain the desired flat faced contact with the diaphragm 33. The pressure cell thus constituted is or may be of subtantially the same construction as illustrated and described in Kingsbury Patent No. 2,091,207 aforesaid, and the diaphragm 33, block 40 and chamber 35 may be circular, elliptical or rectangular in outline as preferred.

Pipe 37 leads to any suitable pump, pressure gauge and auxiliary elements, such as disclosed in said Patent No. 2,091,207, and said elements may be mounted on the end wall of the housing 18 or they may be separately mounted, the pump, pressure measuring instrumentalities, etc., not being illustrated herein as they may be of any suitable character such as fully disclosed in said Patent No. 2,091,207. To indicate whether the thrust being measured is in one direction or the other a suitable gauge 41 may be mounted by means of a bracket 42 on the extremity 26 of cage extension 22 so as to be movable therewith, and therefore with the cage 16, said gauge having a spring actuated button 43 adapted to make contact with the rear wall of the housing 18 to indicate the direction of movement of the cage 16 with respect to said housing and therefore the direction of thrust.

When the thrust measuring device is to be put out of action the screws 21 are tightened up, as shown in Fig. 1, to lock the cage 16 in its central position. In this position the extension 22, 26 on the cage 16 is so related to the housing that button 43 on gauge 41, by reason of its contact with the rear face of the housing 18, disposes the pointer on the gauge 41 at its central or neutral indicating position. With the cage 16 thus locked against axial displacement the thrust bearings 14 and 15 operate as normal thrust bearings, as if no thrust measuring device were present, the thrust in one direction or the other upon one or the other of said thrust bearings 14 and 15 being transmitted to the cage 16 and thence to the housing 18 through the screws 21 and thus to the foundation upon which the housing is mounted.

If the thrust measuring device is to be employed, the screws 21 are backed off as shown in Figs. 2 and 3 so as to leave the cage 16 free to move within the chamber 17. If the thrust is toward the right as viewed in said figures, the thrust bearing 15 is sustaining the thrust on the collar 11 and transmitting the thrust to the cage 16 whereby the latter is moved toward the right hand wall of the chamber 17 as shown in Fig. 2. If the thrust is toward the left, thrust bearing 14 is in operation and the thrust is transmitted to the cage 16 which is moved toward the left hand wall of the chamber 17. As extension 22 is attached to and moves with the cage 16 the thrust on the cage 16 is transmitted through said extension 22 to the thrust measuring unit composed of the plates 28 and 29, 30 and their associated elements, and through them to the housing 18 and thus to the foundation.

If the thrust is toward the right as viewed in Fig. 2 the end wall 44 of chamber 25 engages plate 28 and moves the unit until the outer face of plate 30 seats on the end wall 45 of chamber 27, this engagement occurring before the right hand face of the cage 16 engages the right hand end wall of chamber 17. The thrust is now transmitted from plate 28 to plate 29, 30 through block 40, the diaphragm 33 and the fluid in chamber 35. The amount of thrust is accordingly measured by the pressure developed in the fluid in chamber 35 and this can be indicated by means of a pressure gauge in communication with the pipe 37. Knowing accurately the effective area of the diaphragm 33 so subjected to pressure, the exact load sustained by the thrust bearing can be determined by means of the pressure indicated on the pressure gauge, or the pressure gauge may be calibrated with relationship to the effective area of said diaphragm so as to indicate directly the total load sustained.

If the thrust is toward the left, as viewed in Fig. 3, the thrust bearing 14 sustains the load and transmits the same to the cage 16 which now moves toward the left as viewed in said figure. Extension 22 on cage 16 moves its extremity 26 into engagement with the plate 30, moving the plate 29, 30 with its contained cell toward the left, and the load is transmitted through the diaphragm 33 to the block 40 and plate 28 which is now seated on the left hand wall 46 of the chamber 27, it being understood that plate 28 seats at 46 before the left end of the cage can engage the left end wall of chamber 17. The amount of thrust is again measured by the pressure developed in the fluid in the chamber 35 by reason of the coaction of diaphragm 33 and block 40, and the pressure or total load may be determined from the pressure gauge as heretofore explained.

It is to be understood that in both directions of movement of the unit 28, 29, 30 there is sufficient clearance at 49 so that plates 28 and 29 never contact. In either direction of movement of the extension 26 with respect to the housing 18 the gauge 41 is moved therewith, either away from said housing as in Fig. 2 or towards said housing as in Fig. 3, whereby the button 43 actuates the pointer of said gauge, in one direction or the other, to show whether the pressure being measured represents "ahead" or "astern" thrust.

To prevent intermixture of the oil used in lubricating the thrust bearings and the liquid such as castor oil used in measuring the thrust, separate passages are preferably provided for leading from the housing any leakage from the thrust bearings and from the thrust measuring cell before said liquids have an opportunity to mix. Thus in the embodiments of Figs. 1 to 3 any oil escaping from the thrust bearing chamber within the cage 16 may flow out of the chamber 17 through a passage 47, while any castor oil escaping from the thrust measuring device may flow out of the chamber 27 through passage 48, the liquid in each chamber thus being removed before it can accumulate to an extent that may cause flow past the ring 24 into the other of said chambers.

When the thrust measuring device is to be rendered inactive the cage and associated movable parts should be locked rigidly against axial movement. This may be effected by tightening up the screws 21 heretofore referred to, but in addition thereto, or in place thereof, the clamping means shown in Fig. 4 may be employed. As here shown a plate 50 is secured rigidly both to the housing 18 and the end 26 of the extension on the cage by a plurality of bolts or screws 51 and 52 respectively, and in addition one or more set screws 53 are preferably passed through the plate 50 into engagement with the plate 30 to hold the plates of the thrust measuring device against relative movement and thereby prevent "breathing" of the hydraulic cell.

Fig. 5 illustrates a construction in many respects similar to that heretofore described in connection with the embodiment of Figs. 1 to 4 but employing a set of a plurality of pressure responsive cells for indicating the thrust pressure in both directions. As in the embodiment of Figs. 1 to 4, the shaft 10 carries in any suitable way a thrust collar 11 with which cooperates thrust bearings 14 and 15 contained within the chamber of a cage 16. Cage 16 is axially movable within a chamber within the housing 55, as in the embodiment of Figs. 1 to 4, said housing being provided at its right hand extremity, as viewed in Fig. 5, with an end plate 56 separated from the housing 55 by a ring 57, said plate and ring being secured together and to the housing by means of a plurality of bolts or screws 58. Screws 57' are also preferably provided for locking the meter out of operation, these being backed off when the meter is in service. Plate 56 cooperates with ring 57 to provide a recess at 59 which receives the peripheral flanges 60 and 61 on the plates 62 and 63, respectively, of the thrust measuring unit. Plates 62 and 63 are centrally supported on a sleeve 64 carried by a bolt or screw 65 mounted at its inner end in the end plate 66 of the cage secured thereto by bolts or screws 66', and plates 62 and 63 are mounted on said end plate 66 by a plurality of bolts or screws 67 extending through apertures 68 in the plates 62 and 63 with spacer sleeves 69 interposed between the heads of said screws and the face of the plate 66, said sleeves 69 being of greater length than the combined thickness of plates 62 and 63.

Interposed between the plates 62 and 63 are a plurality of pressure measuring cells which are or may be of substantially the same construction as illustrated in the aforesaid Patent No. 2,091,207 or above described. As shown the plate 62 is provided with a plurality of, preferably three or four symmetrically-arranged, recesses 70 of any suitable shape and in each of which is clamped a diaphragm 71 by means of an annular member 72 secured to the plate 62 by a plurality of screws 73. At one face of each diaphragm 71 plate 62 is recessed at 74 to provide a liquid containing chamber comparable to the chamber 35 in Figs. 1 to 4, all of said chambers being in communication through suitable passages with a pump, pressure measuring device, etc., as disclosed in said Patent No. 2,091,207. Each annular member 72 is provided with a centrally disposed aperture 75 of substantially the same configuration and area as the chamber 74 and mounted within said aperture 75 is a block 76, comparable to block 40, which as here shown is provided with a spherically faced rear projection 77 mounted on a hardened insert 78 suitably retained in an aperture in the inner face of the plate 63.

When the thrust is toward the right as viewed in Fig. 5, thrust bearing 15 is in operation, and the thrust is thus transmitted to the end plate 66 of the cage 16. End plate 66 thus engages and moves to the right the plates 62 and 63 until flange 61 is seated on the shoulder 79 of the recess 59. The thrust is thus transmitted through plate 62 to the fluid in the chambers 74, and through the diaphragms 71 and the blocks 76 to the plate 63 so seated at 79. It is to be understood that there is sufficient clearance at 80 between the plate 66 and the ring 57 so that the same shall not engage and prevent seating of the flange 61 on the surface 79, and also that there is sufficient clearance at 81 between the plates 62 and 63 so that said plates shall not engage within the limits of thrust measurable by the instrument, to the end that the entire thrust will be transmitted by plate 66 to the plate 63 seated at 79, through the thrust cells, diaphragms and blocks, rather than by direct contact. Thus the pressure developed in the cells 70 may be measured on the gauge and the total thrust determined as in the embodiments of Figs. 1 to 4.

If the thrust is toward the left as viewed in Fig. 5, thrust bearing 14 is in operation and the cage 16 is moved to the left, as is also the plate 66 attached thereto, and the plates 62 and 63 which are mounted on the plate 66 by the screws 67. Hence the thrust causes the plate 62 to move to the left until the flange 60 engages the shoulder 82 in recess 59, there being sufficient clearance at 83 between the cage and the housing so as to prevent engagement thereat before flange 60 seats at 82. The thrust is now transmitted from plate 63 to plate 62, but only through the pressure cells including the blocks 76, diaphragms 71 and the liquid in chambers 74, whereby the pressure so developed in said liquid, as reflected at the pressure gauge, again determines the total load exerted on the shaft.

To determine if the entire thrust is being carried by the pressure cells a feeler ring 84 may be mounted in a recess 85 at the inner face of plate 63 and retained therein by a pin 86 cooperating with a groove in the periphery of said recess, said ring having peripheral teeth in mesh with a gear 87 on a stem 88 extending to the exterior of plate 63 where it is provided with any suitable operating means 89. To indicate relative movement between the plates 62 and 63 a pin 90 secured to the former may extend through an aperture in plate 63 and actuate an indicator 91 mounted by a bracket 91' on plate 63 and a similar indicator 92 mounted by a bracket on plate 56 may be actuated by a similar pin 92' secured to plate 66 and projecting through aligned apertures in plates 56 and 57 to show the direction and extent of movement of the cage 16.

To segregate the oil escaping from the thrust bearings from any castor oil escaping from the cells, the chamber within the housing which receives the cage 16 is enlarged at 93 and one or a plurality of passages 94 lead from said enlarged portion, preferably at the lowermost portion thereof, so that any oil escaping from the thrust bearing may flow therethrough without getting into recess 59. Recess 59 in turn has a passage at 95 preferably disposed at the lowermost portion thereof so that any castor oil escaping from the cells will be removed through said passage before it can get over into the chamber 93. As in the embodiment of Figs. 1 to 4 any suitable number of bolts or screws as at 57' may be provided to lock the cage and thrust measuring elements against movement when the thrust measuring device is not to be in operation.

A simplified, and therefore preferred, embodiment of the present invention employing a plurality of cells as in the embodiment of Fig. 5 is shown in Fig. 6. As here shown, the shaft 10 is provided with a thrust collar 11 retained thereon in any suitable way, and cooperating with the opposed faces of said collar are thrust bearings 14 and 15 of any suitable form and construction. As in the embodiment of Fig. 5, said thrust bearings 14 and 15 are mounted within a cage 16 to which is secured an end plate 100 attached thereto by any suitable number of bolts or screws 101. When the thrust is toward the right, as viewed in Fig. 6, the right-hand thrust bearing 15 seats on the end plate 100 and the cage 16 is moved to the right, and when the thrust is toward the left as viewed in this figure, the left-hand thrust bearing 14 seats on the left-hand extremity of said cage 16, and the cage is moved to the left, the cage 16 with its attached end plate 100 being mounted for rectilinear movement within a chamber provided within the surrounding housing as in the embodiments of the invention heretofore described.

In this embodiment a pair of plates 102 and 103 are mounted on the end plate 100 by a plurality of bolts or screws 104 which extend through spacer sleeves 105, located in apertures in said plates, with their inner ends threaded into the end plate 100. Said plates 102 and 103 are suspended from the housing, whose extremity is indicated at 106, by a plurality of bolts or screws 107 extending through spacer sleeves 108 that in turn extend through apertures 109 and 110 in the plates 102 and 103, sleeves 108 being of greater length than the combined thickness of the plates at said apertures. Said plates 102 and 103 when in neutral or intermediate position have a slight clearance from the housing 106 as shown at 111 and from the flange or head 112 on each bolt 107 as shown at 113. Thereby plates 102 and 103 may move to the left or to the right as viewed in Fig. 6 to seat either on the housing 106 or on the flanges 112, depending on the direction of thrust. Plate 102, however, is seated against the outer face of the end plate 100 as shown at 114, the opposed surfaces being relieved at their central portions to provide a small clearance thereat as shown at 115, while plate 103 is normally seated against the flanges or heads 116 on the bolts 104. Thereby the plates 102 and 103 move as a unit with end plate 100.

Interposed between the plates 102 and 103 are a plurality of thrust measuring cells—for example, four arranged at 90° apart. In this embodiment said cells are preferably mounted in the outer plate 103, and to this end plate 103 is provided with a plurality of recesses 117 in each of which is secured a diaphragm 118 by a ring 119 attached to the plate 103 by a plurality of bolts or screws 120. Reciprocatingly mounted within each ring 119 is a block 121 of the type heretofore described and shown as provided with a spherical or knife edge projection 122 mounted on a hardened insert 123 secured in any suitable way in a recess in the plate 102. At the opposite face of each diaphragm 118 from said block 121 the chamber 124, which as in the other embodiments is preferably of substantially the same shape and area as the face of the block 121 which contacts said diaphragm, is provided to receive liquid under pressure led thereto through any suitable passages (not shown) formed in the plate 103. In this embodiment, as the fluid-containing chambers are disposed in the outer plate 103 and at the outer sides of the diaphragms 118, the passages from said chambers may lead directly to the exterior face of the plate 103, thereby providing for shorter and more direct communication with the pressure cells.

It is to be understood that the fluid-containing chambers 124 communicate with any suitable source of liquid under pressure, as castor oil, which may be supplied to the said cells by any suitable pump mounted in any suitable location, as for example fully explained in the aforesaid Patent No. 2,091,207, and all of said cells are preferably in communication with each other and with a single source of liquid under pressure as heretofore explained.

As in the embodiment of Fig. 5, a feeler ring 125 may be interposed between the plates 102 and 103 and operated in any suitable way, as by a gear 126 mounted on a spindle 127 and extending to the exterior of the plate 103 where it is provided with an operating wheel 128. The embodiment of Fig. 6 may also include other features illustrated in conjunction with the embodiment of Fig. 5, but which have been omitted here for sake of simplicity and clearness.

In operation, the embodiment of Fig. 6 functions as described in connection with the embodiment of Fig. 5. When the thrust is toward the right as viewed in Fig. 6, thrust bearing 15 is in operation and the thrust on the collar 11 is transmitted to the end plate 100, moving the plates 102 and 103 to the right as viewed in this figure until they seat on the flanges 112, whereby the thrust is transmitted through bolts 107 to the housing 106. But this thrust is transmitted from plate 100 to plate 102, at their face contact 114, and from plate 102 to plate 103 only through the blocks 121, diaphragms 118 and liquid filled chambers 124, there being a clearance 129 between the plates 102 and 103 which is never taken up during the normal operation of the thrust measuring device—the feeler ring 125 being provided to determine whether such clearance exists at 129. Thus the thrust on the collar 11 is transmitted to the housing 106 only through the liquid in the thrust cells 124, and the pressure thus developed in said cells, as shown on any suitable gauge or other pressure measuring device, is within the principles heretofore explained a measure of the thrust on the shaft.

If the thrust is toward the left as viewed in Fig. 6, the left-hand thrust bearing 14 is in operation and the thrust on the cage 16 is transmitted to the end plate 100 attached thereto and, through the bolts 104 to the plate 103, whereby the plates 103 and 102 move toward the left to seat on the housing 106. But here again the thrust is transmitted from plate 103 to plate 102 only through the liquid under pressure in the chambers 124, the diaphragms 118 and the blocks 121, and therefore again the thrust on the bearing is measured by the pressure developed in the liquid in the chambers 124, which pressure may be read from the gauge or other suitable pressure measuring device associated with the liquid system.

As may be seen by a comparison of the embodiment of Fig. 6 with the embodiment of Fig. 5, a fewer number of parts are employed in the former, and as the chambers containing the liquid under pressure are located in the outer plate and at the outer sides of the diaphragms, a more simple and direct provision for conveying the pressure liquid thereto may be employed. But as in the embodiment of Fig. 5, and also of Figs. 1 to 4, a single set of cells is used for measuring the thrust in both directions, each cell functioning to develop a pressure therein which is a measure of the thrust whether the thrust is transmitted therethrough in one direction or the other. Because of a fewer number of parts and simplified construction the embodiment of Fig. 6 is at present the preferred embodiment, and it may also have incorporated therein any of the additional features of construction heretofore described in conjunction with other embodiments.

Figure 7:
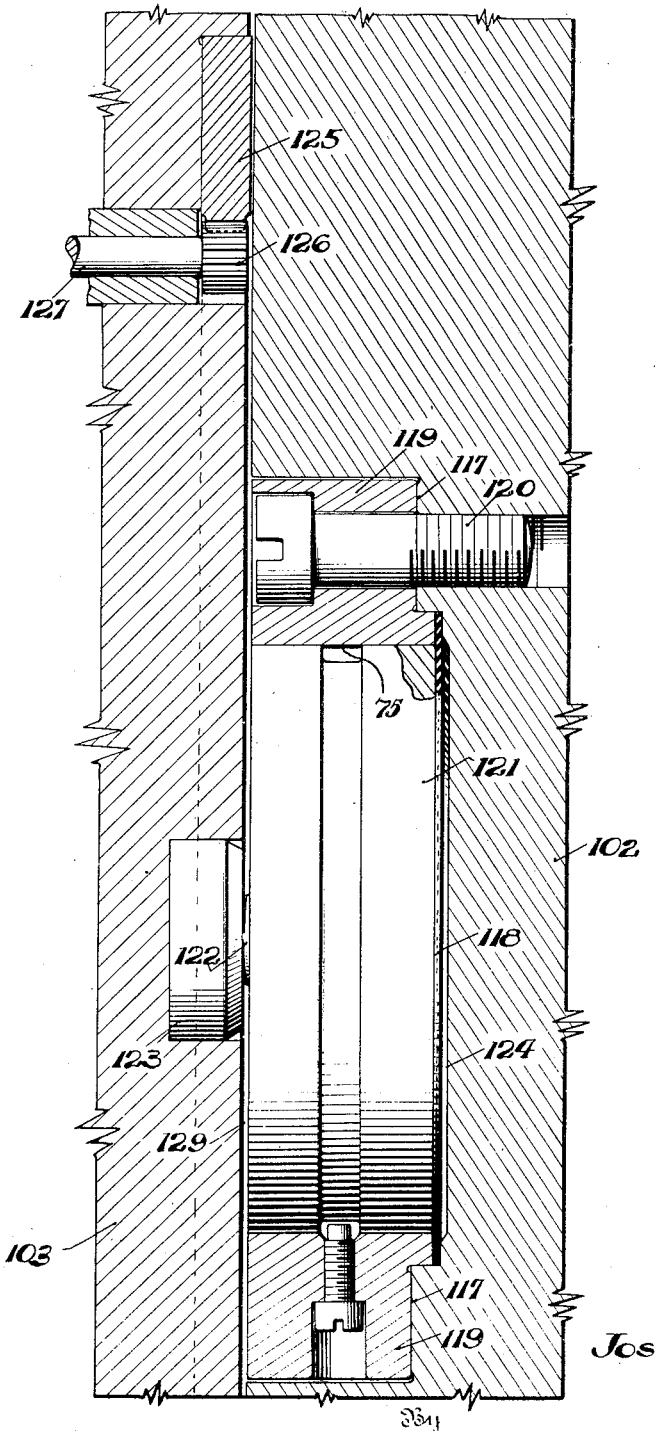
Fig. 7 is an enlarged detail of the pressure cell and associated parts as used in the embodiments of Figs. 5 and 6.

Fig. 7 illustrates on an enlarged scale the details of a single cell, like parts being numbered as in Fig. 6, but this view shows the cells disposed in the inner plate 102 analogously as in Fig. 5 instead of in the outer plate as in Fig. 6. However, in so far as the details of the cell are concerned this figure illustrates a cell or one of a set of cells such as used in both of the embodiments of Figs. 5 and 6 or as may be used in other embodiments of the present invention.

It is to be expressly understood that the present invention contemplates that the thrust measuring mechanism herein disclosed is to be associated with suitable pumping and pressure measuring devices, etc., such for example as disclosed in Patent No. 2,019,207, and which may be of any suitable character and mounted at any suitable location. But with the present invention only one set of pumping and pressure measuring devices is required because the thrust in both directions is measured by means of a single cell or a single set of cells.

It will therefore be perceived that by the present invention an improved thrust measuring device has been provided whereby the thrust in both directions may be measured accurately by use of a single cell or a single set of cells, and this is effected by a construction which is simple, compact and rugged. This thrust measuring device may be readily applied to a wide variety of bearings and easily put into and out of operation, and its pressure does not interfere in any way with the normal operation of the thrust bearing whether or not it is in operation. Means have also been provided which assure that leakage from the cells shall not become intermingled with leakage from the thrust bearings and hence the leakage oil in both instances may be used over again because of this lack of contamination.

While the embodiments of the invention illustrated on the drawings have been described with considerable particularity, it is to be expressly understood that the invention is not restricted thereto as other embodiments thereof will now readily suggest themselves to those skilled in the art while changes may be made in the details of construction, arrangements and proportion of parts, and certain features used without other features, without departing from the spirit of this invention. Reference is therefore to be had to the appended claims for a definition of the invention.

What is claimed is:

1. In a thrust measuring device for double-acting thrust bearings, in combination with a housing and a member for receiving the thrust on the oppositely acting bearings, hydrostatic means for measuring the thrust pressure including a pair of spaced elements having hydrostatic means interposed between the same, said housing being provided with opposed seats on the one or the other of which said elements are seated as the thrust is in one direction or the other, and means for transmitting the thrust on said member to said housing through said elements in one direction or the other depending upon the direction of thrust.

2. In a thrust measuring device for double acting thrust bearings having thrust receiving elements, a housing therefor and a member adapted to receive thrust from said elements and movable in one direction or the other as said thrust is exerted in one direction or the other, a pair of spaced elements movable with said member in one direction or the other as said thrust is exerted in one direction or the other, opposed seats on said housing to be engaged by one or the other of said elements as they move in one direction or the other, and hydrostatic means interposed between said elements and constituting the sole means for transmitting pressure from one of said elements to the other.

3. In a thrust measuring device for double acting thrust bearings having thrust receiving elements, a housing therefor and a member adapted to receive thrust from said elements and movable in one direction or the other as said thrust is exerted in one direction or the other, a pair of spaced elements movable with said member in one direction or the other as said thrust is exerted in one direction or the other, opposed seats on said housing to be engaged by one or the other of said elements as they move in one direction or the other, and hydrostatic means interposed between said elements and constituting the sole means for transmitting pressure from one of said elements to the other, said hydrostatic means including one or more cells each of which includes a diaphragm-closed recess in one of said elements and a block engaging said diaphragm and seated on the other of said elements whereby the pressure on a liquid in said recess or recesses is a measure of the load transmitted.

4. In a thrust measuring device for double acting thrust bearings having thrust receiving elements for receiving thrust in each direction and a housing for said thrust receiving elements, an axially movable cage embracing said thrust receiving elements and moved axially in one direction or the other relatively to said housing as said thrust is exerted in one direction or the other, a pair of elements operatively combined with said cage to be moved therewith, opposed seats on said housing to be engaged by one or the other of said elements as said cage moves in one direction or the other, and hydrostatic means interposed between said elements and constituting the sole means for transmitting the load from one to the other of said elements.

5. In a thrust measuring device for double acting thrust bearings having thrust receiving elements for receiving thrust in each direction and a housing for said thrust receiving elements, an axially movable cage embracing said thrust receiving elements and moved axially in one direction or the other relatively to said housing as said thrust is exerted in one direction or the other, a pair of elements operatively combined with said cage to be moved therewith, opposed seats on said housing to be engaged by one or the other of said elements as said cage moves in one direction or the other, and hydrostatic means interposed between said elements and constituting the sole means for transmitting the load from one to the other of said elements, said hydrostatic means including one or more pressure cells each including a diaphragm-closed recess in one of said elements and a block engaging said diaphragm and seated on the other of said elements whereby the pressure developed on a liquid in said recess or recesses is a measure of the load transmitted from said cage to the housing.

6. In a thrust measuring device for double acting thrust bearings having thrust receiving elements for receiving thrust in each direction and a housing for said thrust receiving elements, an axially movable cage embracing said thrust receiving elements and moved axially in one direction or the other relatively to said housing as said thrust is exerted in one direction or the other, a pair of elements operatively combined with said cage to be moved therewith, opposed seats on said housing to be engaged by one or the other of said elements as said cage moves in one direction or the other, hydrostatic means interposed between said elements and constituting the sole means for transmitting the load from one to the other of said elements, and means for locking said cage to said housing whereby the thrust may be transmitted directly to said housing without going through said elements.

7. In a thrust measuring device for double acting thrust bearings having thrust receiving elements for receiving thrust in each direction and a housing for said thrust receiving elements, an axially movable cage embracing said thrust receiving elements and moved axially in one direction or the other relatively to said housing as said thrust is exerted in one direction or the other, a pair of elements operatively combined with said cage to be moved therewith, opposed seats on said housing to be engaged by one or the other of said elements as said cage moves in one direction or the other, hydrostatic means interposed between said elements and constituting the sole means for transmitting the load from one to the other of said elements, and means movable with said cage and cooperating with said housing to indicate whether the thrust is in one direction or the other.

8. In a thrust measuring device for double acting thrust bearings having thrust receiving elements for receiving thrust in each direction and a housing for said thrust receiving elements, an axially movable cage embracing said thrust receiving elements and moved axially in one direction or the other relatively to said housing as said thrust is exerted in one direction or the other, a pair of elements operatively combined with said cage to be moved therewith, opposed seats on said housing to be engaged by one or the other of said elements as said cage moves in one direction or the other, hydrostatic means interposed between said elements and constituting the sole means for transmitting the load from one to the other of said elements, and means providing separate passages for segregating any liquid escaping from said hydrostatic means from any liquid escaping from a thrust bearing.

9. In a thrust measuring device for double acting thrust bearings, in combination with a housing and means for receiving the thrust on the oppositely acting bearings, hydrostatic means for measuring the thrust pressure on either of said bearings including one or more hydrostatic cells, abutments for said hydrostatic means, and means operatively connected with said first named means for transmitting the thrust pressure to an abutment in either direction through the same cell or cells.

10. In a thrust measuring device for double acting thrust bearings, in combination with a housing and means for receiving the thrust on the oppositely acting bearings, hydrostatic means for measuring the thrust pressure on either of said bearings including one or more hydrostatic cells, abutments for said hydrostatic means, means operatively connected with said first named means for transmitting the thrust pressure to an abutment in either direction through the same cell or cells, and means for restraining said first named means to prevent transmission of the thrust pressure to said cell or cells.

11. In a thrust measuring device for double acting thrust bearings, in combination with a housing and means for receiving the thrust on the oppositely acting bearings, hydrostatic means for measuring the thrust pressure on either of said bearings including one or more hydrostatic cells, abutments for said hydrostatic means, and means operatively connected with said first named means for transmitting the thrust pressure to an abutment in either direction through the same cell or cells, said last named means including opposed members coacting with said cell or cells and moved by said first named means to exert pressure on said cell or cells in one direction or the other depending upon the direction of thrust.

12. In a thrust measuring device for double acting thrust bearings, in combination with a housing and means for receiving the thrust on the oppositely acting bearings, hydrostatic means for measuring the thrust pressure on either of said bearings including one or more hydrostatic cells and means operatively connected with said first named means for transmitting the thrust pressure to said housing in either direction through the same cell or cells, said last named means including a pair of elements between which said cell or cells are interposed and means operatively uniting said first named means with said elements to move one or the other of said elements to a seat on said housing and then exert pressure on said cell or cells depending upon the direction of thrust.

13. In a thrust measuring device for double acting thrust bearings, in combination with a housing and means therein movable in one direction or the other as the thrust on said bearings is in one direction or the other, one or more hydrostatic cells having limited movement in one direction or the other depending on the direction of thrust and having means operatively connected to said first named means for applying pressure to one or the other of the opposite faces of said cell or cells depending upon the direction of thrust.

14. In a thrust measuring device for double acting thrust bearings, in combination with a housing and means therein movable in one direction or the other as the thrust on said bearings is in one direction or the other, one or more hydrostatic cells having means operatively connected to said first named means for applying pressure to one or the other of the opposite faces of said cell or cells depending upon the direction of thrust, said last-named means including elements disposed at the opposite faces of said cell or cells to develop pressure therein by relative movement in one direction or the other depending upon the direction of thrust and said housing having seats to act as abutments for said elements in either direction of load.

15. In a thrust measuring device for double acting thrust bearings, in combination with a housing and means axially movable therein for receiving the thrust on either of said bearings, a single set of one or more hydrostatic cells for measuring the thrust in both directions, means providing opposed seats to act as abutments depending upon the direction of load, and means operatively connected to said first named means for transmitting the load thereon to one of said abutments through the same cell or cells for either direction of thrust.

16. In a thrust measuring device for double acting thrust bearings, in combination with a housing and axially movable means therein for receiving the thrust on either of said bearings, a single set of one or more hydrostatic cells for measuring the thrust in both directions and means operatively connected to said first named means for transmitting the load thereon to said housing through the same cell or cells for either direction of thrust, said last named means including a pair of elements disposed on opposite sides of said cell or cells, abutments in said housing against which one or the other of said elements are moved as the thrust is in one direction or the other, and means for transmitting the thrust load to that one of said elements which is not seated on the housing.

17. In a thrust measuring device for double acting thrust bearings, in combination with a housing and a member in said housing for receiving the thrust on said oppositely acting bearings, said member being axially movable in one direction or the other depending upon the direction of thrust, a single set of one or more hydrostatic cells for measuring the thrust in both directions, and means for transmitting pressure in both directions from said member to said single set of one or more cells whether said member moves in one direction or the other.

18. In a thrust measuring device for double acting thrust bearings, in combination with a housing and a member in said housing for receiving the thrust on said oppositely acting bearings, said member being axially movable in one direction or the other depending upon the direction of thrust, of one or more hydrostatic cells for measuring the thrust in both directions and means whereby pressure is developed by said member in the same cell or cells whether said member moves in one direction or the other, said last named means including a pair of elements between which said cell or cells are disposed, abutments for said elements, and means operatively uniting said elements with said member so that one or the other of said elements is actuated to compress said cell or cells depending upon the direction of thrust.

19. In a thrust measuring device for double acting thrust bearings, in combination with a housing and a member in said housing for receiving the thrust on said oppositely acting bearings, said member being axially movable in one direction or the other depending upon the direction of thrust, one or more hydrostatic cells for measuring the thrust in both directions and means whereby pressure is developed by said member in the same cell or cells whether said member moves in one direction or the other, said last named means including a pair of elements between which said cell or cells are disposed, abutments in said housing against which one or the other of said elements may seat, and means operatively uniting said member with said elements to move one or the other of said elements against its abutment depending upon the direction of thrust and to transmit the load from said member to that element which is not seated on an abutment.

20. In a thrust measuring device for double acting thrust bearings, in combination with a housing and a member in said housing for receiving the thrust on said oppositely acting bearings, said member being axially movable in one direction or the other depending upon the direction of thrust, and hydrostatic means for developing pressure whether said member moves in one direction or the other, said last named means including a pair of plates one of which carries a diaphragm-closed chamber and the other of which is provided with a block in face contact with said diaphragm, means operatively connecting said member to said plates to move said plates in one direction or othe other depending upon the direction of thrust, and abutments in said housing engaged by one or the other of said plates depending upon the direction of thrust, said last-named means operating to transmit the thrust from said member to that plate which is not engaged with an abutment.

JOSEPH CORBY, Jr.